US009323791B2

(12) United States Patent
Hagenbuch et al.

(10) Patent No.: US 9,323,791 B2
(45) Date of Patent: *Apr. 26, 2016

(54) APPARATUS AND METHOD FOR EXPANDING A SHARED-NOTHING SYSTEM

(71) Applicant: Pivotal Software, Inc., Palo Alto, CA (US)

(72) Inventors: Brian Hagenbuch, Annapolis, MD (US); Gavin Sherry, San Mateo, CA (US); Jeffrey Ira Cohen, Sunnyvale, CA (US); Chris Pedrotti, San Jose, CA (US); John Glenn Eshleman, San Mateo, CA (US); Florian Michael Waas, San Francisco, CA (US); Joy Kent, Belmont, CA (US)

(73) Assignee: Pivotal Software, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/296,847

(22) Filed: Jun. 5, 2014

(65) Prior Publication Data

US 2015/0006589 A1    Jan. 1, 2015

Related U.S. Application Data

(63) Continuation of application No. 12/788,256, filed on May 26, 2010, now Pat. No. 8,768,973.

(51) Int. Cl.
*G06F 17/30* (2006.01)
*G06F 9/50* (2006.01)

(52) U.S. Cl.
CPC ........ *G06F 17/30289* (2013.01); *G06F 9/5083* (2013.01); *G06F 17/30575* (2013.01)

(58) Field of Classification Search
CPC ................ G06F 17/30575; G06F 17/30194; G06F 67/1097
USPC .................................................. 707/803, 654
See application file for complete search history.

(56) References Cited

U.S. PATENT DOCUMENTS

| | | | |
|---|---|---|---|
| 5,970,495 A * | 10/1999 | Baru et al. | |
| 6,321,238 B1 | 11/2001 | Putzolu | |
| 6,438,562 B1 | 8/2002 | Gupta et al. | |
| 6,681,230 B1 | 1/2004 | Blott et al. | |
| 6,704,782 B1 * | 3/2004 | Achtermann et al. | 709/224 |
| 7,185,076 B1 | 2/2007 | Novaes et al. | |
| 7,370,029 B2 | 5/2008 | Ito et al. | |
| 7,389,300 B1 * | 6/2008 | Shah et al. | |
| 7,440,977 B2 | 10/2008 | Bae et al. | |
| 7,472,125 B2 | 12/2008 | Shimizu et al. | |
| 7,512,625 B2 | 3/2009 | Lariba-Pey et al. | |
| 7,590,653 B2 * | 9/2009 | Sparks | |
| 7,818,349 B2 | 10/2010 | Frost | |
| 7,937,376 B2 | 5/2011 | Baba et al. | |
| 7,949,640 B2 * | 5/2011 | Holenstein et al. | 707/690 |
| 8,041,685 B2 | 10/2011 | Ito et al. | |
| 8,380,951 B1 * | 2/2013 | Krinke et al. | 711/162 |
| 8,768,973 B2 | 7/2014 | Hagenbuch et al. | |
| 2003/0177146 A1 * | 9/2003 | Zimowski | 707/200 |

(Continued)

*Primary Examiner* — Thanh-Ha Dang
(74) *Attorney, Agent, or Firm* — Fish & Richardson P.C.

(57) ABSTRACT

A computer readable storage medium includes executable instructions to evaluate an expanded shared-nothing data store configuration. A data redistribution schedule table with specified parameters is formed. Data is redistributed within the expanded shared-nothing data store in accordance with the data redistribution schedule table.

17 Claims, 6 Drawing Sheets

(56) References Cited

U.S. PATENT DOCUMENTS

| | | |
|---|---|---|
| 2003/0220935 A1* | 11/2003 | Vivian et al. .................. 707/102 |
| 2004/0148289 A1 | 7/2004 | Bamford et al. |
| 2004/0210605 A1 | 10/2004 | Hara et al. |
| 2004/0215639 A1* | 10/2004 | Bamford ............... G06F 9/5083 |
| 2004/0215640 A1* | 10/2004 | Bamford et al. ............. 707/100 |
| 2005/0027719 A1 | 2/2005 | Maciel et al. |
| 2005/0131893 A1 | 6/2005 | Von Glan |
| 2005/0154731 A1* | 7/2005 | Ito et al. .......................... 707/10 |
| 2005/0187977 A1 | 8/2005 | Frost |
| 2006/0218205 A1 | 9/2006 | Shimizu et al. |
| 2006/0224551 A1 | 10/2006 | Lariba-Pey et al. |
| 2006/0236055 A1* | 10/2006 | Iitsuka .................... G06F 13/28 711/165 |
| 2006/0259525 A1 | 11/2006 | Bae et al. |
| 2007/0162506 A1* | 7/2007 | Grosman et al. ........... 707/104.1 |
| 2007/0168470 A1* | 7/2007 | Nonaka et al. ................. 709/219 |
| 2007/0260621 A1 | 11/2007 | Smolen et al. |
| 2007/0288474 A1* | 12/2007 | Baba et al. ....................... 707/10 |
| 2008/0189239 A1 | 8/2008 | Bawa et al. |
| 2009/0043822 A1* | 2/2009 | Sarkar .................. G06F 3/0605 |
| 2009/0063807 A1 | 3/2009 | Cox et al. |
| 2010/0125555 A1* | 5/2010 | Lau et al. ....................... 707/674 |
| 2010/0211821 A1* | 8/2010 | Donie et al. ..................... 714/6 |
| 2010/0235606 A1 | 9/2010 | Oreland et al. |
| 2010/0246578 A1* | 9/2010 | Zhong ................. H04L 67/1095 370/390 |
| 2010/0293412 A1* | 11/2010 | Sakaguchi .......... G06F 11/0715 714/17 |
| 2011/0179341 A1* | 7/2011 | Falls et al. ..................... 714/807 |
| 2011/0246481 A1 | 10/2011 | Narayanan et al. |
| 2014/0337471 A1* | 11/2014 | Yasuda et al. ................. 709/217 |

* cited by examiner

APPARATUS AND METHOD FOR EXPANDING A SHARED-NOTHING SYSTEM

RELATED APPLICATION

This application is a continuation of U.S. patent application Ser. No. 12/788,256, now U.S. Pat. No. 8,768,973, filed on May 26, 2010, the entirety of which is hereby incorporated by reference.

FIELD OF THE INVENTION

This invention relates generally to digital data storage and retrieval in a shared-nothing system. More particularly, this invention relates to a technique for expanding a shared-nothing system with minimal service interruption.

BACKGROUND OF THE INVENTION

Figure 1:
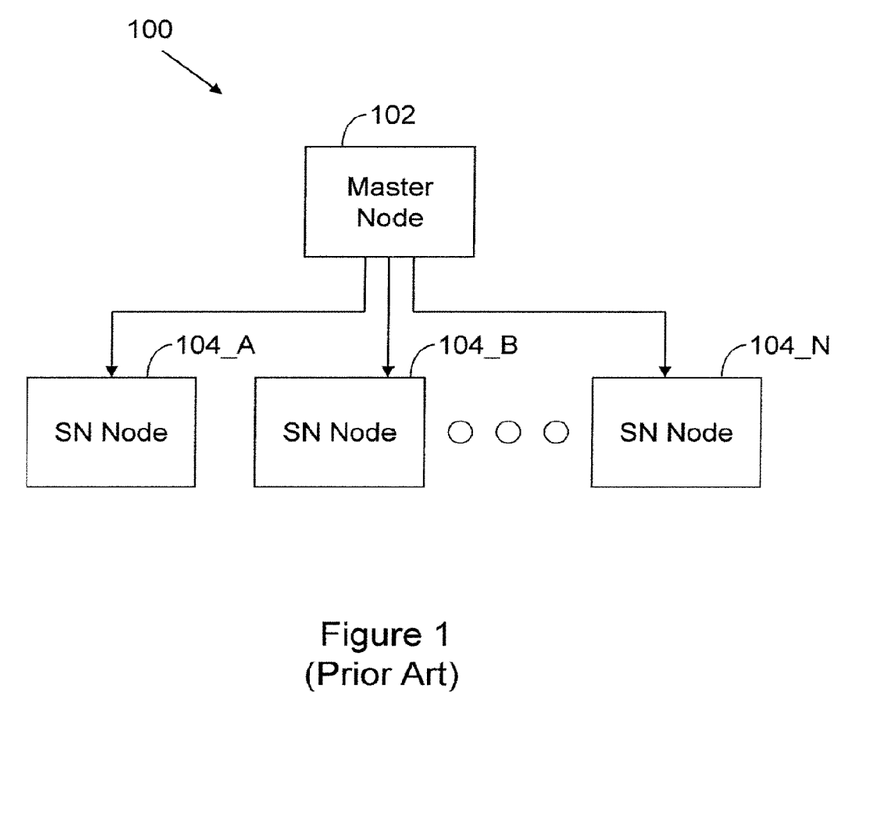
FIG. 1 illustrates a shared-nothing network architecture known in the art.

FIG. 1 illustrates a shared-nothing network 100 known in the art. The shared- nothing network or architecture 100 includes a master node 102 and a set of shared-nothing nodes 104_A through 104_N. Each shared-nothing node 104 has its own private memory, disks and input/output devices that operate independent of any other node in the architecture 100. Each node is self sufficient, sharing nothing across the network. Therefore, there are no points of contention across the system and no sharing of system resources. The advantage of this architecture is that it is highly scalable.

Database systems store data in tables distributed across shared-nothing nodes. Data is stored by assigning each datum (e.g., record or row) to one of the nodes. Data is typically assigned to nodes according to one of two principles. One approach is hash distribution, which uses a hash function to map data to nodes. Another approach is to assign data to nodes in a round-robin or random manner.

The part of the datum for which the hash is computed is referred to as a distribution key. The distribution key can be a compound key, i.e., consisting of several columns of a row. Hash distribution results in uniform data distribution and the co-location of records with the same distribution key (i.e., records with the same distribution key are assigned to the same node). Co-location of data is frequently exploited in join operations where data from different database tables are joined. Join operations are usually the most costly operation in a query workload. By selecting frequently used join columns as distribution keys, joins can be performed on a per-node basis without having to redistribute the data among nodes between processing steps. All rows of a table are distributed using the same distribution keys. Individual tables generally differ in choice of distribution key.

Nodes are added to a shared-nothing system to accommodate more data or additional query workloads. When new nodes are added to a system, data needs to be redistributed. Data redistribution commonly entails the examination and positional reassignment of individual datum. Reassessing each row of a large data store can take a significant amount of time, e.g., reassigning tens or hundreds of terabytes of data may take several days. Consequently, it is common practice to schedule downtime of several days when a node is added to a shared-nothing system. It would be desirable to minimize the downtime associated with the expansion of a shared-nothing data store.

SUMMARY OF THE INVENTION

A computer readable storage medium includes executable instructions to evaluate an expanded shared-nothing data store configuration. A data redistribution schedule table with specified parameters is formed. Data is redistributed within the expanded shared-nothing data store in accordance with the data redistribution schedule table.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 2:
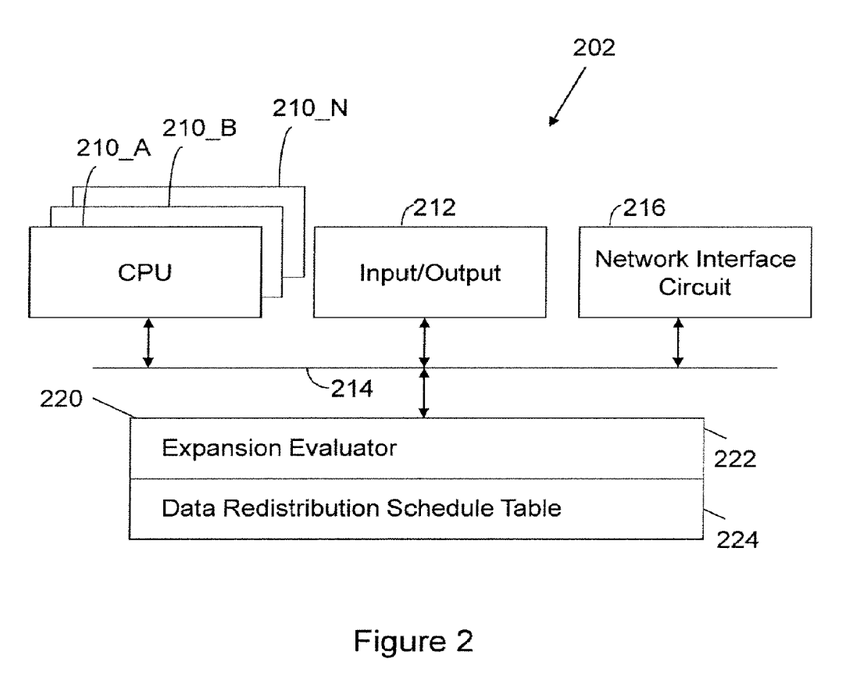
FIG. 2 illustrates a master node of a shared-nothing network implemented in accordance with an embodiment of the invention.

FIG. 2 illustrates a master node 202 configured to implement operations of the invention. The master node 202 includes standard components, such as one or more CPUs 210_A through 210_N. The CPUs are attached to input/output devices 212 via a bus 214. The input/output devices 212 may include standard components, such as a keyboard, mouse, display, printer and the like. A network interface circuit 216 is also connected to the bus 214, allowing the master node 202 to operate in a networked environment.

A memory 220 is also connected to the bus 214. The memory 220 stores executable instructions to implement embodiments of the invention. In particular, the memory 220 stores an expansion evaluator 222. The expansion evaluator 222 includes executable instructions to evaluate the addition of one or more nodes to a shared-nothing system. Based upon the performance attributes of the existing and added nodes. the expansion evaluator 222 forms a data redistribution schedule table with parameters 224, which is stored in memory 220. A user may access the table 224 to reconfigure the data redistribution task and/or to track the progress of the data redistribution task.

Figure 3:
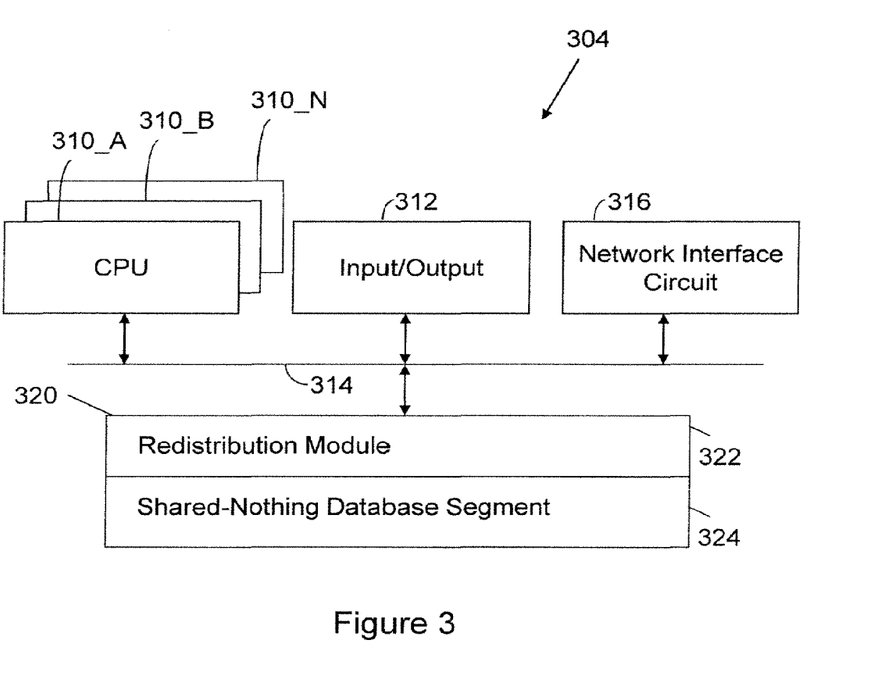
FIG. 3 illustrates a shared-nothing node of a shared-nothing network implemented in accordance with an embodiment of the invention.

FIG. 3 illustrates a shared nothing node 304 implemented in accordance with an embodiment of the invention. The shared nothing node 304 also includes standard components, such as a set of CPUs 310_A through 310_N, which are connected to a bus 314. A set of input/output devices 312 are also connected to the bus 314. A network interface circuit 316, also connected to the bus 314, provides connectivity to a network.

A memory 320 is also connected to the bus 314. The memory 320 includes data and executable instructions to implement operations of the invention. In particular, the memory 320 includes a redistribution module 322 with executable instructions to redistribute data within a shared-nothing database segment 324. The redistribution module 322 distributes data in accordance with the data redistribution schedule table.

Figure 4:
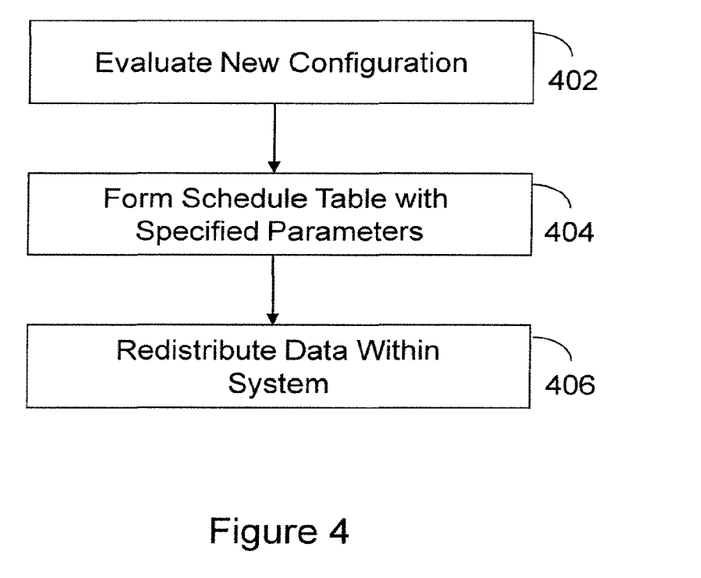
FIG. 4 illustrates processing operations associated with an expansion evaluator implemented in accordance with an embodiment of the invention.

FIG. 4 illustrates processing operations associated with an embodiment of the invention. A new shared-nothing data store configuration is evaluated 402. This may be implemented with the expansion evaluator 222. A data redistribution schedule table with specified parameters is then foisted 404. This operation may also be implemented with the expansion evaluator 222. Data is then redistributed within the shared-nothing system 406. Redistribution modules 322 on individual nodes may be used to implement this operation.

Figure 5:
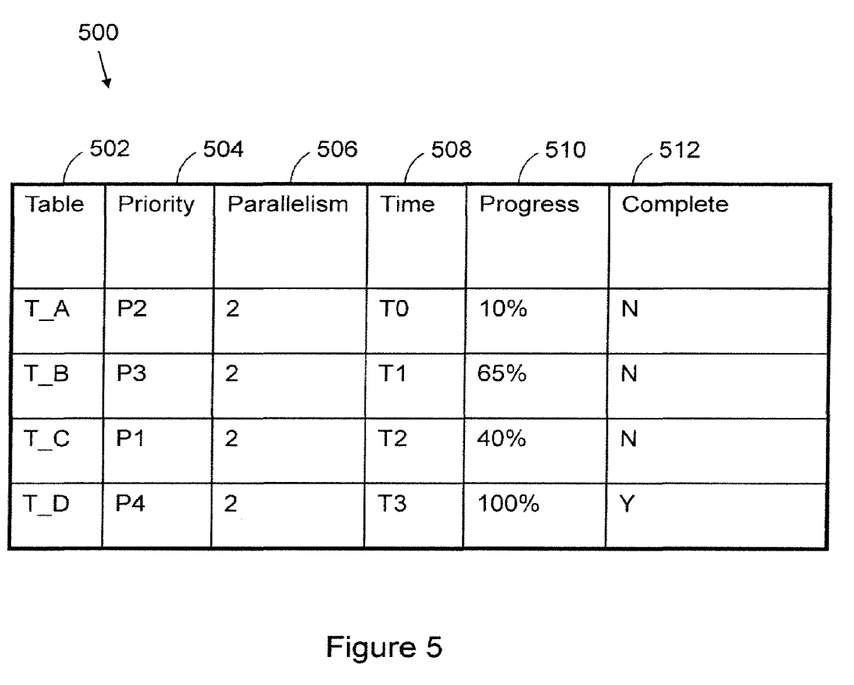
FIG. 5 illustrates a schedule table implemented in accordance with an embodiment of the invention.

FIG. 5 illustrates a data redistribution schedule table 500 configured in accordance with an embodiment of the invention. The table 500 includes a column 502 specifying different tables that need to be migrated. The table 500 also includes a column 504 specifying the priority that should be ascribed to the migration of the table. Thus, for example, a frequently used table may be assigned a high priority.

The table 500 also specifies a degree of parallelism 506. The degree of parallelism characterizes the number of source tables that can be simultaneously redistributed. The table 500 may also have one or more time columns 508. The time column may specify a start time for a data migration task. The time column 508 may also specify a duration time that a task may be performed (e.g., from midnight to six in the morning on consecutive days until completed).

FIG. 5 illustrates that the table 500 may include a progress column 510. The progress information characterizes the percent completion of a data migration task. Finally, the table 500 may also include a completion column 512 to indicate whether a data migration task has been completed.

As previously indicated, the expansion evaluator 222 may be used to form the table 500. Preferably, the table is available for editing by an administrator. For example, the table is preferably editable by an administrator to alter parameters, such as priority, parallelism and time. Regular query tools, such as SQL may be used to alter parameters of the table.

Figure 6:
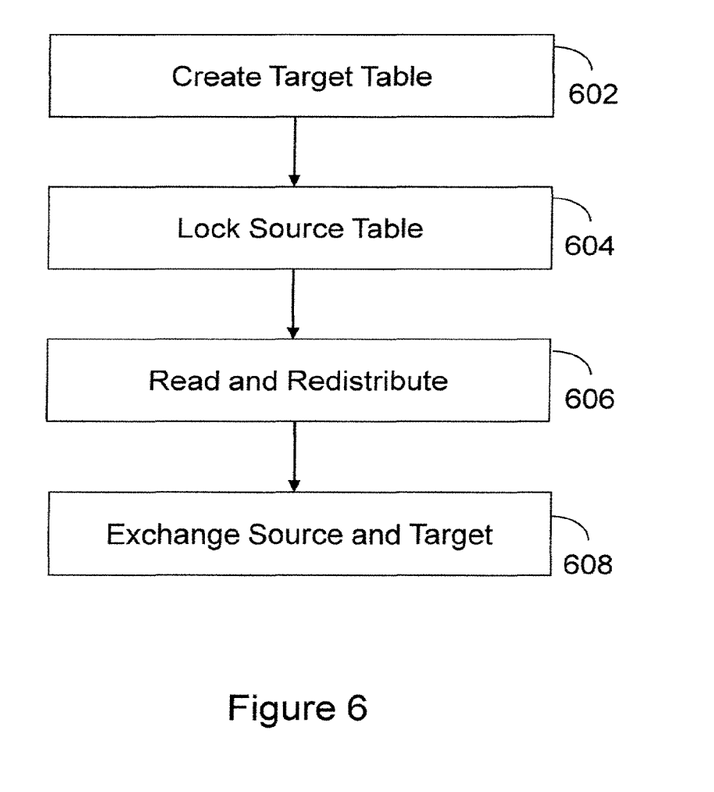
FIG. 6 illustrates table redistribution operations performed in accordance with an embodiment of the invention.

FIG. 6 illustrates operations performed by a redistribution module 322. In one embodiment, the redistribution module 602 creates a target table corresponding to an existing table 602. For example, the target table is formed on a newly added node of the system. The target table is a clone of the original table definition, but does not contain any data and is not visible to other transactions. The source table is then locked 604. This prevents updates, but reads are permitted. Data is read from the source table and is redistributed to the target table 606. That is, data is read row-by-row and is inserted into the target table. When the data exchange is complete, the source and target tables are atomically exchanged. That is, the system sees the new target table instead of the original source table.

The distribution policy of a table encodes the type of distribution to be used e.g., hash or round robin. In the case of a hash distribution, the distribution policy defines the distribution key. Preferably, the distribution of each table is recorded in the database catalog (a table and partitions of a table are referred to as a table for simplicity). In the case of hash distribution, the datum (one or more columns of a row) is used to compute a hash value. Hash values are mapped to nodes, e.g., based on a modulo operation. Preferably, the distribution policy is transparent to the client application, in which case distributed data can be accessed with the same queries by a client. Depending on the distribution, the query processor may choose different execution plans and exploit co-location due to hash distribution, where applicable. Depending on the query workload it may not be possible to process randomly distributed data as efficiently as hash distributed data, both in terms of response time and resource footprint, e.g., memory.

The data migration of the invention may be implemented with minimal downtime. In one embodiment, the system is offline only during an initialization stage. In the initialization stage, a data directory is formed and information about all user tables from all existing databases is defined on a new node. This process captures metadata for each table in an expansion schema for status tracking. As part of the initialization process, the policy for all tables is set to random distribution (i.e., hash distribution policies are nullified). Users can continue to access the database after initialization is complete and the system is back online. While online, data integrity is maintained and normal operations, such as ETL jobs, user queries and reporting can be supported. Each table or partition is unavailable for write operations only when the table is in flight, i.e., when the table is being redistributed.

Thus, the invention supports expansion of a shared-nothing database with minimal downtime. The invention redistributes individual tables according to a new mapping to spread data uniformly across original and added nodes. Data redistribution may be performed while the database system is fully operational. Data that has not been redistributed remains accessible, although access efficiency may be reduced. Preferably, fault-tolerance of the system is maintained during the redistribution by maintaining at least two copies of each datum.

The data redistribution schedule table with specified parameters allows an administrator to tailor data migration tasks. For example, the table may be used to allow an administrator to give priority to frequently used tables so that they are redistributed first. The table may also be set to perform data redistribution tasks at specific times, e.g., only during off-peak hours. A degree of parallelism may also be defined to specify the number of tables to be redistributed at once.

An embodiment of the present invention relates to a computer storage product with a computer readable storage medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs, DVDs and holographic devices; magneto-optical media; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using JAVA®, C++, or other programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A non-transitory computer readable storage medium, storing instructions which, when executed by a computing system, cause the computing system to perform operations comprising:
   responsive to detecting a second node being added to a data store having a first node:
      forming a data redistribution schedule table that stores one or more parameters for a redistribution of a set of data stored in a source table to a target table, wherein:
         the source table is associated with the first node,
         the target table is associated with the second node, and
      causing the set of data stored in the source table to be redistributed to the target table in accordance with the one or more parameters stored in the data redistribution schedule table, including:
         forming the target table on the second node;
         copying table definitions from the source table to the target table;
         migrating data from the source table to the target table; and
         exchanging the target table and the source table responsive to determining that the migration has completed,
   wherein each of the first node and second node comprises a respective storage device that is independent from storage devices of other nodes of the data store.

2. The non-transitory computer readable storage medium of claim 1, wherein the data store is a shared-nothing data store.

3. The non-transitory computer readable storage medium of claim 1, wherein exchanging the source table with the target table is an atomic transaction.

4. The non-transitory computer readable storage medium of claim 1, wherein the source table is stored on the first node, and the target table is stored on the second node.

5. The non-transitory computer readable storage medium of claim 4, the operations further comprising: enabling access to data stored on the first node, while the set of data in the source table is being redistributed to the target table.

6. The non-transitory computer readable storage medium of claim 1, wherein the one or more parameters include a time parameter specifying a start time, and the operations further comprise: delaying the redistribution of the set of data in accordance with the start time.

7. A method comprising:
   responsive to detecting a second node being added to a data store having a first node:
      forming a data redistribution schedule table that stores one or more parameters for a redistribution of a set of data stored in a source table to a target table, wherein:
         the source table is associated with the first node,
         the target table is associated with the second node, and
      causing the set of data stored in the source table to be redistributed to the target table in accordance with the one or more parameters stored in the data redistribution schedule table, including:
         forming the target table on the second node;
         copying table definitions from the source table to the target table;
         migrating data from the source table to the target table; and
         exchanging the target table and the source table responsive to determining that the migration has completed,
   wherein each of the first node and second node comprises a respective storage device that is independent from storage devices of other nodes of the data store.

8. The method of claim 7, wherein the data store is a shared-nothing data store.

9. The method of claim 7, wherein exchanging the source table with the target table is an atomic transaction.

10. The method of claim 7, wherein the source table is stored on the first node, and the target table is stored on the second node.

11. The method of claim 10, further comprising: enabling access to data stored on the first node, while the set of data in the source table is being redistributed to the target table.

12. The method of claim 7, wherein the one or more parameters include a time parameter specifying a start time, and further comprising: delaying the redistribution of the set of data in accordance with the start time.

13. A system, comprising:
   one or more computers and one or more storage devices storing instructions that are operable, when executed by the one or more computers, to cause the one or more computers to perform operations comprising:
   responsive to detecting a second node being added to a data store having a first node:
      forming a data redistribution schedule table that stores one or more parameters for a redistribution of a set of data stored in a source table to a target table, wherein:
         the source table is associated with the first node,
         the target table is associated with the second node, and
      causing the set of data stored in the source table to be redistributed to the target table in accordance with the one or more parameters stored in the data redistribution schedule table, including:
         forming the target table on the second node;
         copying table definitions from the source table to the target table;
         migrating data from the source table to the target table; and
         exchanging the target table and the source table responsive to determining that the migration has completed,
   wherein each of the first node and second node comprises a respective storage device that is independent from storage devices of other nodes of the data store.

14. The system of claim 13, wherein the data store is a shared-nothing data store.

15. The system of claim 13, wherein exchanging the source table with the target table is an atomic transaction.

16. The system of claim 13, wherein the source table is stored on the first node, and the target table is stored on the second node.

17. The system of claim 16, the operations further comprising:
   enabling access to data stored on the first node, while the set of data in the source table is being redistributed to the target table.

* * * * *

UNITED STATES PATENT AND TRADEMARK OFFICE
CERTIFICATE OF CORRECTION

PATENT NO. : 9,323,791 B2
APPLICATION NO. : 14/296847
DATED : April 26, 2016
INVENTOR(S) : Brian Hagenbuch et al.

Page 1 of 1

It is certified that error appears in the above-identified patent and that said Letters Patent is hereby corrected as shown below:

In the Claims

In Claim 1, Column 5, line 18: after "node," delete "and";

In Claim 7, Column 5, line 60: after "node," delete "and";

In Claim 13, Column 6, line 37: after "node," delete "and".

Signed and Sealed this
Twenty-eighth Day of June, 2016

Michelle K. Lee
*Director of the United States Patent and Trademark Office*